United States Patent
Davankov et al.

(10) Patent No.: US 6,531,523 B1
(45) Date of Patent: Mar. 11, 2003

(54) METHOD OF MAKING BIOCOMPATIBLE POLYMERIC ADSORBING MATERIAL FOR PURIFICATION OF PHYSIOLOGICAL FLUIDS OF ORGANISM

(75) Inventors: Vadim Davankov, Moscow (RU); Maria Tsyurupa, Moscow (RU); Ludmila Pavlova, Moscow (RU)

(73) Assignee: Renal Tech International, LLC, New York, NY (US)

( * ) Notice: Subject to any disclaimer, the term of this patent is extended or adjusted under 35 U.S.C. 154(b) by 107 days.

(21) Appl. No.: 09/684,085

(22) Filed: Oct. 10, 2000

(51) Int. Cl.[7] .............................. C08L 83/00; C08J 9/30
(52) U.S. Cl. .................. 523/201; 523/206; 521/65; 521/69; 521/72; 525/244; 525/246; 525/242; 525/243; 525/260; 525/263; 525/267; 525/333.2; 526/319; 526/320; 526/73; 526/329.2; 526/347
(58) Field of Search ................... 525/333.2, 244, 525/246, 260, 263, 267, 242, 243; 521/65, 69, 72; 523/201, 206; 526/73, 319

(56) References Cited

U.S. PATENT DOCUMENTS

| | | | | |
|---|---|---|---|---|
| 5,145,675 A | * | 9/1992 | Won | 424/484 |
| RE34,112 E | * | 10/1992 | Ma | 210/686 |
| 5,596,051 A | * | 1/1997 | Jahns et al. | 428/402.2 |
| 5,773,384 A | * | 6/1998 | Davankov et al. | 502/402 |
| 5,969,030 A | * | 10/1999 | Grandhee | 523/201 |
| 6,001,922 A | * | 12/1999 | Clark et al. | 524/457 |

* cited by examiner

*Primary Examiner*—Tatyana Zalukaeva
(74) *Attorney, Agent, or Firm*—I. Zborovsky

(57) ABSTRACT

A beaded polymeric adsorbent has a core part; a shell part arranged around the core part, with one of the parts having a lipophilic property and another of the parts having a hydrophilic property, and is produced by preparing an organic phase composed of water insoluble monounsaturated and poly unsaturated comonomers; preparing an aqueous phase composed of a mixture of water soluble monounsaturated and polyunsaturated comonomers; forming a dispersion of the organic phase and the aqueous phase in a single vessel; and creating conditions for first polymerizing of one of the phases which forms the core part and thereafter polymerizing the other of the phases which forms the shell part.

9 Claims, No Drawings

METHOD OF MAKING BIOCOMPATIBLE POLYMERIC ADSORBING MATERIAL FOR PURIFICATION OF PHYSIOLOGICAL FLUIDS OF ORGANISM

BACKGROUND OF THE INVENTION

This invention relates to biocompatible and hemocompatible polymeric adsorbents having a basically hydrophobic porous interior and a hydrophilic outer covering, and methods of preparing these adsorbing materials. Polymeric adsorbents with an inverted sequence of the two layers, namely, a polar hydrophilic core and a hydrophobic shell, can be also prepared in accordance with the same general scheme of radical polymerization in a dispersed two phase system.

Porous hydrophobic natural and polymeric materials, in particular, activated carbon and macroporous polystyrene resins, are widely used in manifold adsorption technologies. If not for the low hemocompatibility, they also would present materials of choice for purifying blood or other physiological fluids from many endogenic and exogenic toxic organic compounds. It is exactly because of the high adsorption activity of the surface of the above adsorbent particles, that the hydrophobic materials activate the blood complement system, cause deposition of platelets and, finally, lead to clot formation. Therefore, in hemoperfusion procedures, only surface modified particles of the adsorbents can be employed. Modification means formation of a surface layer or coating with a substancialy reduced adsorption activity, in particular, formation of a hydrophilic and hemocompatible shell, without affecting significantly the basically hydrophobic nature of the pores in the core of the particle.

Traditionally, the coating procedure is carried out as a special chemical procedure that is different both in its chemical nature and reactors involved, as well as reaction conditions.

Thus, best known example of an efficient hydrophobic adsorbent is Amberlite XAD-4 manufactured by Rohm and Haas Company (U.S.). These materials are produced by suspension polymerization of divinylbenzene or copolymerization of the latter with styrene in the presence of a diluent which is miscible with the monomers, but causes precipitation of the polymer formed during the polymerization. Due to the micro phase separation in the polymeric bead under formation, the space occupied by the diluent gives rise to macro pores of the final material, whereas the precipitated polymeric phase represents rigid walls of the pores. Typical values of surface area of the macroporous adsorbents are less than 300–500 sq.m/g, typical pore diameters amount to several hundreds to several thousands angstrom. To make this kind of adsorbing materials biocompatible, Korshak et al (U.S. Pat. No. 4,140,652) suggest adsorption of albumin on the surface of the beads, followed by polycondensation of the adsorbed protein with aldehydes (preferably, formaldehyde) or other bifunctional crosslinking agents for proteins. Similarly, Abe in U.S. Pat. No. 4,202,775 adsorbs total plasma proteins on the surface of porous polymeric materials and then cross-links the adsorbed protein layerwith a suitable cross-linking agent. The hydrophobic basic material is thus provided with a hydrophilic and biocompatible shell.

A thin hydrophilic layer is formed on the surface of porous hypercrosslinked polystyrene materials by chemical transformations of the surface exposed residual chloromethyl groups into hydrophilic functional groups (Davankov et al., U.S. Pat. No. 5,773,384). In another set of chemical reactions, Davankov et al. U.S. Pat. No. 6,114,466 suggest chemical transformation of surface exposed pendant vinyl groups of a divinylbenzene-rich copolymer into a series of other, hydrophilic functional groups. Among these reactions, radical grafting of water soluble monomers by treating the porous polymer in an aqueous or aqueous-organic solution of these monomers and radical initiators was suggested.

SUMMARY OF THE INVENTION

It is an object of present invention to provide a method of producing a biocompatible hydrophobic polymeric porous material, which is a further improvement of the existing methods.

In keeping with these objects and with others which will become apparent hereinafter, one feature of present invention resides, briefly stated in a method of producing beaded polymeric porous adsorbents having a hydrophobic porous core part and a hydrophilic shell part with lilophilic property of one of said parts and hydrophilic property of another of said parts, comprising the steps of preparing an organic phase composed of water insoluble monounsaturated and polyunsaturated comonomers and a porogen; preparing an aqueous phase composed of a mixture of water soluble monounsaturated and polyunsaturated comonomers; forming a dispersion of the organic phase and the aqueous phase in a single vessel; and creating conditions for first polymerizing said organic phase and formation of said hydrophobic porous core and thereafter polymerizing said aqueous phase and formation of said hydrophilic the shell part which coats said core part.

In accordance with another feature of the present invention a beaded polymeric porous adsorbent material is proposed having a hydrophobic porous core part and a hydrophilic shell part arranged around said core part wherein said beaded polymeric adsorbent is produced by preparing an organic phase composed of water insoluble monounsaturated and polyunsaturated comonomers and water immiscible organic solvents as porogens; preparing an aqueous phase composed of a mixture of water soluble monounsaturated and polyunsaturated comonomers; forming a dispersion of the organic phase and the aqueous phase in a single vessel; and creating conditions for first polymerizing of said organic phase and formation of said hydrophobic porous core part and thereafter polymerizing said aqueous phase and formation of said hydrophilic porous shell part which coats said core part.

In accordance with the present invention, the components of the organic phase produce the core part of the final adsorbent, while the components of the aqueous phase produce the shell in the same reaction vessel. This can be done in the form of two successive polymerization reactions, first in the organic phase which forms the core part and then in the aqueous phase which forms the shell part and coats the core part. In some situations, a simultaneous radical copolymerization process or so-called "one-step process" can be performed.

If the organic phase is dispersed in the aqueous phase, then the dispersed organic phase produces the hydrophobic porous core part of the final adsorbent, while the water dissolved monomers produce the hydrophilic shell.

The novel features which are considered as characteristic for the present invention are set forth in particular in the appended claims.

DESCRIPTION OF PREFERRED EMBODIMENTS

In accordance with the present invention biocompatible and hemocompatible polymeric adsorbents having a basically hydrophobic porous interior and a hydrophilic outer covering, are prepared in a "one-pot" or "one-step".

The inventive method includes preparing an organic phase composed of water insoluble monounsaturated and polyunsaturated comonomers and a porogen; preparing an aqueous phase composed of a mixture of water soluble monounsaturated and polyunsaturated comonomers; forming a dispersion of the organic phase and the aqueous phase in a single vessel; and creating conditions for first polymerizing of said organic phase and formation of said hydrophobic porous core part and thereafter polymerizing of said aqueous phase and formation of said hydrophilic porous shell part which coats said core part.

In accordance with the invention the two procedures of formation of the polymeric adsorbent bead and coating of the latter are combined into a simple procedure carried out simultaneously or as a sequence of two steps in one single reactor.

In the inventive method polymerization must start within the dispersed phase. Otherwise, the spherical shape of the particles will be destroyed or distorted. The crosslinking density of the core must be higher than that of the shell. Otherwise, the mechanical stability of the shell is endangered.

To meet the first requirement, the radical polymerization initiator is initially added to the dispersed phase, not the dispersion medium. The second radical initiator is added to the dispersion medium only after the major part of the comonomers in the dispersed phase converts into polymeric material. In some cases, no second radical initiator is needed, at all. This is because many growing polymer chains with their chain-end radicals show up at the phase interface and can initiate the polymerization in the dispersion medium. Moreover, the first radical initiator, like benzoyl peroxide, generates radicals relatively slowly. This initiator is only partially consumed during the formation of beads even after several hours of polymerization. This initiator easily moves toward the surface of the bead and activates there the surface exposed pendant vinyl groups of the divinylbenzene moiety of the bead, thus initiating the graft polymerization of the water soluble monomers.

The dispersed organic phase contains water immisible organic solvents, porogens. Thermodynamically good solvents for the growing polymer chains favor formation of microporous copolymers, Θ-solvents favor formation of predominantly mesoporous structure (pore diameters 2.0 to 20.0 nm), whereas non-solvents result in the formation of conventional macroporous beads. All three kinds of the above porogens can be used in the above described simultaneous or step-wise procedures of preparation of the core-shell type adsorbing material.

There is a principal difference between the conventional separate-step coating of the beads and the here described one-step or one-pot procedure. The principal difference is the presence of the porogen within the porous beads that form in the dispersed phase. For this reason, the grafting of the polymeric chains from the dispersion medium can only proceed on the outer surface of the bead, whereas in the case of previously used protocols, all larger pores of the preformed polymer appear accessible to the monomers to be grafted. Therefore, the materials prepared in the conventional separate and the here suggested combined version of grafting polymerization are basically different. The difference mainly results in the full hydrophobicity of macro pores in the product of the combined polymerization conducted in accordance with the present invention. Contrary, when receiving the coating in a conventional separate grafting polymerization step, the macropores of the adsorbent get coated as well.

Finally, it turned to be possible to realize the same one-step and one-pot procedures with inverted "water-in-oil" suspensions. Aqueous solution that contains water soluble comonomers and crosslinking agent, when dispersed in an organic media, can receive during the polymerization in the dispersed droplets a hydrophobic coating, by grafting hydrophobic comonomers, for example, styrene from the organic dispersion medium.

The invention is further explained by several examples.

EXAMPLE 1

7.2 L of water was placed in 14 L glass vessel equipped with a stirrer and a reflux condenser and heated till 80° C. When the temperature reached 60° C., 13.0 g of stabilizer, AIRVOL 523, were added. The stabilizer was dissolved within 40 min on stirring. Then 14.0 g, of monosodium phosphate, 46.8 g of disodium phosphate, 28.7 g of trisodium phosphate, 72 g of sodium chloride and 150 mg of sodium nitrite were added. After complete dissolution of the chemicals the solution of 11.1 g of benzoyl peroxide in 935 ml of divinylbenzene, 765 ml of ethylstyrene, 1600 ml of isooctane and 1120 ml of toluene was dispersed in the above aqueous phase. After 1.5 hours of stirring at 80° C. a solution of 54.2 ml of N-vinyl-2-pyrrolidone in 200 ml of water was added. The polymerization was afterwards carried out for 9 hours at 80° C. Upon accomplishing the reaction, beads were washed rigorously with hot water, methanol and cold water. The beads were filtered out and dried in oven at 60 to 80° C. Inner surface area of the polymer amounted to 650 $m^2/g$, average pore size; was 200 Å, the polymer was easily wetted with water.

EXAMPLE 2

7.2 L of water were placed in 14 L glass vessel equipped with a stirrer and a reflux condenser and heated till 80° C. When the temperature reached 60° C. 13.0 g of stabilizer, AIRVOL 523, were added. The stabilizer was dissolved within 40 min on stirring. Then 14.0 g of monosodium phosphate, 46.8 g of disodium phosphate, 28.7 g of trisodium phosphate, 72 g of sodium chloride and 150 mg of sodium nitrite were added. After complete dissolution of the chemicals the solution of 11.1 g of benzoyl peroxide in 1720 ml of 55% divinylbenzene, 1600 ml of iso-octane and 1120 ml of toluene was dispersed in the above aqueous phase. In 3 hours of stirring at 80° C. the solution of 15 ml of N-vinyl-2-pyrrolidone in 200 ml of water was added. The polymerization was carried out for 6 hours more at 80° C. Upon accomplishing the reaction, beads were washed rigorously with hot water, methanol and cold water. The beads were filtered out and dried in oven at 60 to 80° C. Inner surface area if the polymer amounted to 650 $m^2$, average pore size was 230_, the polymer was easily wetted with water.

EXAMPLE 3

4.9 L of water were placed in 14 L glass vessel equipped with a stirrer and a reflux condenser and heated till 80° C. When the temperature reached 60° C. 12.0 g of stabilizer, AIRVOL 523, were added. The stabilizer was dissolved within 40 min on stirring. Then 9.1 g of monosodium phosphate, 30.3 g of disodium phosphate, 17.3 g of trisodium phosphate, 47.0 g of sodium chloride and 100 mg of sodium nitrite were added. After complete dissolution of the chemicals the solution of 18.6 g of benzoyl peroxide in 945 ml of divinylbenzene, 655 ml of ethylstyrene, 1500 ml of isooctane and 10500 ml of toluene was dispersed in the above aqueous phase. After 12 hours of stirring at 80° C., 27.3 g of ammonium persulfate were introduced into the aqueous phase. In 5 min the solution of 19.6 ml of N-vinyl-2-pyrrolidone in 100 ml of water was added. The polymerization was additionally carried out for 3 hours at 80° C. Upon accomplishing the reaction, beads were washed rigorously with hot water, methanol and cold water. The beads were filtered out and dried in oven at 60 to 80° C. Inner surface are of the polymer amounted to 650 m$^2$/g, the polymer was wetted with water.

EXAMPLE 4

5 L of water were placed in 14 L glass vessel equipped with a stirrer and a reflux condenser and heated till 80° C. When the temperature reached 60° C. 12.0 g of stabilizer, AIRVOL 523, were added. The stabilizer was dissolved within 40 min on stirring. Then 50 g of sodium bicarbonate and 200 mg of sodium nitrite were added. After complete dissolution of the chemicals the solution of 18.6 g of benzoyl peroxide in 1500 ml of 63% divinylbenzene, 1500 ml of iso-octane and 10500 ml of toluene was dispersed in the above aqueous phase. Afer 12 hours of stirring at 80° C., 27.3 g of ammonium persulfate were introduced into the aqueous phase. In 15 min the solution of 26 ml of N-vinyl-2-pyrrolidone in 100 ml of water were added. The polymerization was carried out for 3 hours at 80° C. Upon accomplishing the reaction, beads were washed rigorously with hot water, methanol and cold water. The beads were filtered out and dried in oven at 60 to 80° C. The polymer was wetted with water.

EXAMPLE 5

5 L of water were placed in a 4 L glass vessel equipped with a stirrer and a reflux condenser and heated till 80° C. When the temperature reached 60° C. 12.0 g of stabilizer, AIRVOL 523, were added. The stabilizer was dissolved within 40 min on stirring. Then 9.1 g of monosodium phosphate, 30.3 g of disodium phosphate, 17.3 g of trisodium phosphate, 47.0 g of sodium chloride and 100 mg of sodium nitrite were added. After complete dissolution of the chemicals the solution of 18.6 g of benzoyl peroxide in 1500 ml of 63% divinylbenzene, 1500 ml of iso-octane and 10500 ml of toluene was dispersed in the above aqueous phase. In 12 hours of stirring at 80° C. 27.3 g of ammonium persulfate were introduced into aqueous phase. In 10 min the solution of 41 g of acrylamide in 100 ml of water was added. The polymerization was additionally carried out for 3.5 hours at 80° C. Upon accomplishing the reaction, beads were washed rigorously with hot water, methanol and cold water. The beads were filtered out and dried in oven at 60 to 80° C. The polymer is wetted with water.

EXAMPLE 6

5 L of water were placed in a 14 L glass vessel equipped with a stirrer and a reflux condenser and heated till 80° C. When the temperature reached 60° C. 12.0 g of stabilizer, AIRVOL 523, were added. The stabilizer was dissolved within 40 min on stirring. Then 25 g of sodium carbonate and 200 mg of sodium nitrite were added. After complete dissolution of the chemicals the solution of 18.6 g of benzoyl peroxide in 1500 ml of 63% divinylbenzene, 1500 ml of iso-octane and 10500 ml of toluene was dispersed in the above aqueous phase. In 12 hours of stirring at 80° C. 27.3 g of ammonium persulfate were introduced into the aqueous phase. In 5 min the solution of 41 g of 2-hydroxyethyl methacrylate in 150 ml of water were added. The polymerization was carried out for 3 hours at 80° C. Upon accomplishing the reaction, beads were washed rigorously with hot water, methanol and cold water. The beads were filtered out and dried in oven at 60 to 80° C. The polymer is wetted with water.

EXAMPLE 7

7.2 L of water were placed in a 14 L glass vessel equipped with a stirrer and a reflux condenser and heated till 80° C. When the temperature reached 60° C. 13.0 g of stabilizer, AIRVOL 523, were added. The stabilizer was dissolved within 40 min on stirring. Then 9.1 g of monosodium phosphate, 30.3 g of disodium phosphate, 17.3 g of trisodium phosphate, 47.0 g of sodium chloride and 100 mg of sodium nitrite were added. After complete dissolution of the chemicals the solution of 11.1 g of benzoyl peroxide in 1720 ml of 55% divinylbenzene, 1600 ml of iso-octane and 1120 ml of toluene was dispersed in the above aqueous phase. In 12 hours of stirring at 80° C. the temperature was lowered to 40° C. and the solution of 40.6 g ammonium persulfate in 100 ml of water was added. In several minutes 35 ml of tetramethyl ethylene diamine were introduced and afterwards the solution of 54.2 ml of N-vinyl-2-pyrrolidone in 200 ml of water was added. The grafting was carried out for 2 hours at 40° C. Upon accomplishing the reaction, beads were washed rigorously with hot water, methanol and cold water. The beads were filtered out and dried in oven at 60 to 80° C. The polymer is wetted with water.

EXAMPLE 8

5 L of water were placed in a 14 L glass vessel equipped with a stirrer and a reflux condenser and heated till 60° C. When the temperature reached 60° C. 12.0 g of stabilizer, AIRVOL 523, were added. The stabilizer was dissolved within 40 min on stirring. Then 25 g of sodium carbonate and 200 mg of sodium nitrite were added. After complete dissolution of the chemicals the solution of 13.5 g of Vazo-52 in 800 ml of styrene, 700 ml of 63% divinylbenzene, 1500 ml of cyclohexane was dispe sed in the above aqueous phase. In 4 hours of stirring at 60° C. the solution of 41 g of 2-hydroxyethyl methacrylate in 150 ml of water were added. The polymerization was carried out for 4 hours at 60° C. Upon accomplishing the reaction, beads were washed rigorously with hot water, methanol and cold water. The beads were filtered out and dried in oven at 60 to 80° C. Inner surface area of the polymer amounts to 88 m$^2$/g, the polymer contains micropores of about 20 Å and mesopores of about 100 Å diameter, the polymer is wetted with water.

EXAMPLE 9

5 L of water were placed in a 14 L glass vessel equipped with a stirrer and a reflux condenser and heated till 80° C. When the temperature reached 60° C. 14.0 g of stabilizer, AIRVOL 523, were added. The stabilizer was dissolved within 40 min on stirring. Then 35 g of sodium carbonate and 200 mg of sodium nitrite were added. After complete dissolution of the chemicals the solution of 20 g of benzoyl peroxide in 900 ml of buthyl methacrylate, 700 ml of 63% divinylbenzene, 1250 ml of toluene was dispersed in the above aqueous phase. In 3 hours of stirring at 80° C. the solution of 41 g of 2-hydroxyethyl methacrylate in 100 ml of water was added. The polymerization was carried out for 9 hours at 80° C. Upon accomplishing the reaction, beads were washed rigorously with hot water, methanol and cold water. The beads were filtered out and dried in oven at 60 to 80° C. The polymer is wetted with water.

EXAMPLE 10

5 L of water were placed in a 14 L glass vessel equipped with a stirrer and a reflux condenser and heated till 80° C. When the temperature reached 60° C. 15.5 g of stabilizer, AIRVOL 523, were added. The stabilizer was dissolved within 40 min on stirring. Then 25 g of sodium carbonate and 200 mg of sodium nitrite were added. After complete dissolution of the chemicals the solution of 20 g of benzoyl peroxide in 945 ml of divinylbenzene, 555 ml of ethylstyrene, 3000 ml of iso-octane was dispersed in the above aqueous phase. In 4 hours of stirring at 80° C. the solution of 41 g of 2-hydroxyethyl methacrylate in 150 ml of water were added. The polymerization was carried out for 3 hours at 80° C. Upon accomplishing the reaction, beads were washed rigorously with hot water, methanol and cold water. The beads were filtered out and dried in oven at 60 to 80° C. Inner surface area of the polymer amounts to 560 $m^2/g$, average pore size of macropores amounts to 350 Å, the polymer is wetted with water.

EXAMPLE 11

7.2 L of water were placed in a 14 L glass vessel equipped with a stirrer and a reflux condenser and heated till 80° C. When the temperature reached 60° C. 13.0 g of stabilizer, AIRVOL 523, were added. The stabilizer was dissolved within 40 min on stirring. Then 14.0 g of monosodium phosphate, 46.8 g of disodium phosphate, 28.7 g of trisodium phosphate, 72 g of sodium chloride and 150 mg of sodium nitrite were added. After complete dissolution of the chemicals the solution of 11.1 g of benzoyl peroxide in 1500 ml of trivinylbenzene, 1500 ml of iso-octane and 1000 ml of toluene was dispersed in the above aqueous phase. In tree hours of stirring at 80° C. the solution of 54.2 ml of N-vinyl-2-pyrrolidone in 200 ml of water were added. The polymerization was afterwards carried out for 9 hours at 80° C. Upon accomplishing the reaction, beads were washed rigorously with hot water, methanol and cold water. The beads were filtered out and dried in oven at 60 to 80° C. Inner surface area of the polymer is 900 $m^2/g$. The polymer is wetted with water.

EXAMPLE 12

7.2 L of water were placed in a 14 L glass vessel equipped with a stirrer and a reflux condenser and heated till 80° C. When the temperature reached 60° C. 13.0 g of stabilizer, AIRVOL 523, were added. The stabilizer was dissolved within 40 min on stirring. Then 14.0 g of monosodium phosphate, 46.8 g of disodium phosphate, 28.7 g of trisodium phosphate, 72 g of sodium chloride and 150 mg of sodium nitrite were added. After complete dissolution of the chemicals the solution of 11.1 g of benzoyl peroxide in 900 ml of a-methylstyrene, 300 ml of diisopropenylbenzene, 1700 ml of heptane and 930 ml of toluene was dispersed in the above aqueous phase. In three hours of stirring at 80° C. the solution of 70.3 ml of N-vinyl-2-pyrrolidone in 200 ml of water was added. The polymerization was afterwards carried out for 9 hours at 80° C. Upon accomplishing the reaction, beads were washed rigorously with hot water, methanol and cold water. The beads were filtered out and dried in oven at 60 to 80° C. The polymer is wefted with water.

EXAMPLE 13

5 L of water were placed in a 14 L glass vessel equipped with a stirrer and a reflux condenser and heated till 80° C. When the temperature reached 60° C. 15.5 g of stabilizer, AIRVOL 523, were added. The stabilizer was dissolved within 40 min on stirring. Then 20 g of sodium carbonate and 300 mg of sodium nitrite were added. After complete dissolution of the chemicals the solution of 20 g of benzoyl peroxide in 1000 ml of buthyl methacrylate, 350 ml of ethyleneglycol dimethacrylate, 1800 ml of toluene was dispersed in the above aqueous phase. In 4 hours of stirring at 80° C. the solution of 41 g of 2-hydroxyethyl methacrylate in 150 ml of water was added. The polymerization was carried out for 3 hours at 80° C. Upon accomplishing the reaction, beads were washed rigorously with hot water, methanol and cold water. The beads were filtered out and dried in oven at 60 to 80° C. The polymer obtained contains mostly micropores of 10 to 20 Å in diameter and a small portion of mesopores around 150 Å. The polymer is wetted with water.

EXAMPLE 14

4 L xylene (a mixture of isomers) is placed in a 10 L glass vessel equipped with a stirrer and reflux condenser and heated to 70° C. When the temperature is reached, 10.0 g of sorbite monostearate is added. The stabilizer is dissolved within 30 min. Then the solution of 31.2 g of potassium persulfate, 1300 g of 2-hydroxyethyl methacrylate and 259 g of methylene-bis(acryl amide) in 1500 ml of water is introduced on stirring. In two hours 30 g of azo-bis-isobuthyronitrile are added to the organic phase followed by the addition of 78 g of styrene. The mixture is agitated for 10 hours at 70° C. Upon accomplishing the reaction, the beads obtained are washed with xylene and methanol and dried in oven at 60 to 80° C. The polymer obtained is easily wetted and dispersed in heptane.

EXAMPLE 15

4 L xylene (a mixture of isomers) is placed in a 10 L glass vessel equipped with a stirrer and reflux condenser and heated to 50° C. When the temperature is reached, 10.0 g of sorbite monostearate is added. The stabilizer is dissolved within 40 min. Then the solution of 31.2 g of potassium persulfate, 1300 g of N-vinyl-2-pyrrolidone and 260 g of methylene-bis(acryl amide) in 1500 ml of water is introduced on stirring. In 1.5 hours the temperature increases till 80° C. and 30 g of benzoyl peroxide is added to the organic phase followed by the addition of 63 g of methyl methacrylate in 10 min. The slurry is agitated for 8 hours at 80° C. Upon accomplishing the reaction, the beads obtained are washed with xylene, methanol, the mixture of methanol and water and dried in oven at 60 to 80° C. The polymer obtained is wetted with heptane.

EXAMPLE 16

4 L xylene (a mixture of isomers) is placed in a 10 L glass vessel equipped with a stirrer and reflux condenser and heated to 50° C. When the temperature is reached, 10.0 g of sorbite monostearate is added. The stabilizer is dissolved within 30 min. Then the solution of 43 g of potassium persulphate, 1750 g of tris(hydroxymethyl) methylacrylamide and 440 g of methylene-bis(acryl amide) in 1200 ml of water is introduced on stirring. In 1.5 hours the temperature increased till 80° C. and 48 g of benzoyl peroxide is added to the organic phase followed by the addition of 21.3 g of styrene in 10 min. The slurry is agitated for 8 hours at 80° C. Upon accomplishing the reaction, the beads obtained are washed with xylene, methanol, the mixture of methanol and water and dried in oven at 60 to 80° C. The polymer contains micro- and mesopores around 20 and 160 Å in diameter. The polymer is wetted with heptane.

EXAMPLE 17

4 L xylene (a mixture of isomers) is placed in a 10 L glass vessel equipped with a stirrer and reflux condenser and heated to 50° C. When the temperature is reached, 10.0 g of sorbite monostearate is added. The stabilizer is dissolved within 30 min. Then the solution of 43 g of potassium persulfate, 1750 g of tris-(hydroxymethyl)methylacrylamide and 87.5 g of methylenebis-(acryl amide) in 1300 ml of water is introduced on stirring. In 2 hours the temperature increases till 80° C and 48 g of benzoyl peroxide is added to the organic phase followed by the addition of 21.3 g of styrene in 10 min. The slurry is agitated for 8 hours at 80° C. Upon accomplishing the reaction, the beads obtained are washed with xylene, methanol, the mixture of methanol and water and dried in oven at 60 to 80° C. The polymer is wetted with heptane.

EXAMPLE 18

50 ml of water is placed in a 100 ml vessel equipped with a stirrer and a reflux condenser and heated till 80° C. When the temperature is reached 0.2 g of AIRVOL 523 is added. After complete dissolution of the stabilizer 2 mg of sodium nitrite and 0.65 g of acrylamide are added. Afterwards the solution of 0.39 g of benzoyl peroxide and 13 g of pure p-divinylbenzene in 26 ml of toluene is dispersed in the above aqueous phase. The polymerization is carried out for 9 hours at 80° C. Upon accomplishing the reaction, the beads obtained are washed with hot water, methanol and cold water and dried in oven at 60 to 80° C. The beads are wetted with water.

What is claimed as new and desired to be protected by Letters Patent is set forth in the appended claims:

What is claimed is:

1. A method of producing beaded polymer porous adsorbents having a hydrophobic porous core part and a hydrophilic shell part, comprising the steps of preparing an organic phase composed of water insoluble monounsaturated and polyunsaturated comonomers and a porogen; preparing an aqueous phase composed of a mixture of water soluble monounsaturated and polyunsaturated comonomers; forming a dispersion of the organic phase and the aqueous phase in a single vessel; and creating conditions for first polymerizing of said organic phase and formation of said hydrophobic porous core part and thereafter polymerizing said aqueous phase and formation of said hydrophilic shell part which coats said core part.

2. A method as defined in claim 1, wherein said creating step includes introducing in said organic phase which forms the core part a radical polymerization initiator.

3. A method as defined in claim 1, wherein said creating step includes introducing in said hydrophilic phase which forms the shell part a suspension stabilizer.

4. A method as defined in claim 1, wherein said organic phase contains a mixture of monovinyl co-monomers selected from group consisting of styrene, α-methylstyrene, ethylstyrene, vinylbenzylchloride, n-alkyl methacrylate, vinyl chloride, acrylo nitrile and polyvinyl co-monomers selected from the group composed of divinylbenzene, trivinylbenzene, m-diisopropenylbenzene, ethyleneglycol dimethacrylate, divinylether, and mixtures thereof.

5. A method as defined in claim 1, wherein said organic phase contains as the porogen water-immiscible organic solvents selected from the group consisting of non-solvents good solvents and Θ-solvents for the corresponding polymer that forms in that phase, to form at a macroporous, microporous and mesoporous crosslinked polymeric material, respectively.

6. A method as defined in claim 1, wherein said aqueous phase contains a mixture of water soluble monovinyl co-monomers selected from the group consisting of 2-hydroxyethyl-methacrylate, glicidyl methacrylate, N-vinylpyrrolidone, N-vinylcaprolactame, acrylamide, N-isopropylacrylamide and polyvinyl co-monomers selected from the group consisting of methylene-bis (acrylamide), divinyl sulfone, and mixtures thereof.

7. A method as defined in claim 1, wherein a ratio of said monounsaturated to said polyunsaturated comonomers varies in the range between 0:100 and 95:5 for said organic phase and between 100:0 and 90:10 for said aqueous phase.

8. A method as defined in claim 1, wherein said mixture of said water soluble mono unsaturated and polyunsaturated co-monomers is added to said aqueous phase at a beginning of a polymerization process in said organic phase.

9. A method as defined in claim 1, wherein said mixture of mono unsaturated and polyunsaturated co-monomers in said aqueous phase is added to said mixture of said mono unsaturated and polyunsaturated co-monomers of said organic phase only after a major part of the co-monomers in said organic phase converts into a polymeric material.

\* \* \* \* \*